(12) United States Patent
Moorer (10) Patent No.: US 8,082,320 B1
(45) Date of Patent: Dec. 20, 2011

(54) COMMUNICATING SUPPLEMENTAL INFORMATION OVER A BLOCK ERASURE CHANNEL

(75) Inventor: James A. Moorer, Panacea, FL (US)

(73) Assignee: Adobe Systems Incorporated, San Jose, CA (US)

(*) Notice: Subject to any disclaimer, the term of this patent is extended or adjusted under 35 U.S.C. 154(b) by 924 days.

(21) Appl. No.: 12/100,348

(22) Filed: Apr. 9, 2008

(51) Int. Cl.
*G06F 15/16* (2006.01)

(52) U.S. Cl. ...................... 709/217

(58) Field of Classification Search .............. 709/217
See application file for complete search history.

(56) References Cited

U.S. PATENT DOCUMENTS

| | | | |
|---|---|---|---|
| 5,926,649 A | 7/1999 | Ma et al. | |
| 7,222,190 B2 | 5/2007 | Klinker et al. | |
| 7,269,157 B2 | 9/2007 | Klinker et al. | |
| 7,532,676 B2 | 5/2009 | Fonseka et al. | |
| 7,792,325 B2* | 9/2010 | Rhoads et al. | 382/100 |
| 7,831,718 B2* | 11/2010 | Chapweske | 709/227 |
| 2002/0010892 A1 | 1/2002 | Lodge et al. | |
| 2002/0110239 A1* | 8/2002 | Venkatesan et al. | 380/28 |
| 2006/0230162 A1 | 10/2006 | Chen et al. | |
| 2007/0133420 A1* | 6/2007 | Guven et al. | 370/238 |
| 2007/0189517 A1* | 8/2007 | Koseki et al. | 380/30 |
| 2008/0069242 A1* | 3/2008 | Xu et al. | 375/240.24 |
| 2008/0112405 A1 | 5/2008 | Cholas et al. | |
| 2008/0232357 A1* | 9/2008 | Chen | 370/389 |
| 2008/0273458 A1* | 11/2008 | Guo et al. | 370/229 |
| 2009/0182890 A1* | 7/2009 | Moorer | 709/231 |
| 2011/0002554 A1* | 1/2011 | Uslubas et al. | 382/238 |

FOREIGN PATENT DOCUMENTS

| | | |
|---|---|---|
| WO | WO2005/091585 | 9/2005 |
| WO | WO2006/005334 | 1/2006 |

OTHER PUBLICATIONS

Lapidoth, A., The performance of convolutional codes on the block erasure channel using various finite interleaving techniques, Sep. 1994, IEEE Transactions on Information Theory, vol. 40 Issue:5, pp. 1459-1473.*

Acharya, et al. "Dissemination-Based Data Delivery Using Broadcast Disks", IEEE Personal Communications, Dec. 1995, pp. 50-60.

Alstrup, et al. "Introducing Octoshape—A New Technology for Large-Scale Streaming over the Internet", EBU Technical Review, Jul. 2005, 10 pages.

(Continued)

*Primary Examiner* — Wing Chan
*Assistant Examiner* — Alicia Baturay
(74) *Attorney, Agent, or Firm* — Fish & Richardson P.C.

(57) ABSTRACT

Methods, systems, and apparatus, including medium-encoded computer program products, for communicating information. In general, one or more aspects of the subject matter described in this specification can be embodied in one or more methods that include obtaining supplemental information to be sent along with primary information over a block erasure channel; calculating numerical residuals for the supplemental information using corresponding prime numbers; outputting the numerical residuals to be sent along with the primary information over the block erasure channel for recovery of the supplemental information at a recipient device using a proper subset of the prime numbers; receiving a proper subset of numerical residuals that were calculated, using corresponding prime numbers, for supplemental information associated with primary information, the primary information and the numerical residuals having been sent over a block erasure channel; and recovering the supplemental information using the proper subset of numerical residuals.

30 Claims, 3 Drawing Sheets

OTHER PUBLICATIONS

Bittorrent, "Technology: Peer Accelerated Content Delivery", downloaded from the internet at http://www.bittorrent.com/dna/technology.html, on Jan. 2, 2008, 3 pages.

Byers, et al. "A Digital Fountain Approach to Asynchronous Reliable Multicast", IEEE Journal on Selected Areas in Communication, vol. 20, Issue 8, Oct. 2002, pp. 1528-1540.

Goldreich, et al. "Chinese Remaindering with Errors", IEEE Transactions on Information Theory, vol. 46, Issue 4, Jul. 2000, pp. 1330-1338.

Knuth, The Art of Computer Programming, Second Edition, vol. 2: Seminumerical Algorithms, 1969, pp. 268-276 (11 pages).

Luby, "LT Codes", Proceedings of the $43^{rd}$ Symposium on Foundations of Computer Science, Nov. 2002, 10 pages.

Luby, et al. "Practical Loss-Resilient Codes" Proceedings of the Twenty-Ninth Annual ACM Symposium on Theory of Computing, 1997, 20 pages.

Kazaa, "How Peer-to-Peer (P2) and Kazaa Software Works", downloaded from the internet at http://www.kazaa.com/us/help/new_p2p.htm, on Jan. 2, 2008, 2 pages.

McKay, "Information Theory, Interference, and Learning Algorithms, Chapter 50: Digital Fountain Codes", Cambridge University Press, 2003, pp. 588-596.

Mitzenmacher, "Digital Fountains: A Survey and Look Forward", IEEE Information Theory Workshop, Oct. 2004, pp. 271-276.

Stone, "Multiple-Burst Error Correction with the Chinese Remainder Theorem", J. Soc. Indust. Appl. Math, vol. 11, No. 1, Mar. 1963, pp. 74-81.

Wikipedia, "Chinese Remainder Theoreum", downloaded from the internet at http://en.wikipedia.org/wiki/Chinese_remainder_theoreum on Jan. 3, 2008, 7 pages.

Office Action mailed May 20, 2010 by U.S. Patent Office in U.S. Appl. No. 12/014,702, filed Jan. 15, 2008, 36 pages.

Office Action mailed Oct. 29, 2010 by U.S. Patent Office in U.S. Appl. No. 12/014,702, filed Jan. 15, 2008, 37 pages.

Advisory Action mailed Mar. 15, 2011 by U.S. Patent Office in U.S. Appl. No. 12/014,702, filed Jan. 15, 2008, 4 pages.

Office Action mailed Jun. 30, 2011 by U.S. Patent Office in U.S. Appl. No. 12/014,702, filed Jan. 15, 2008, 20 pages.

Hunter, William E., Attorney, Response filed Aug. 17, 2010 in U.S. Appl. No. 12/014,702, filed Jan. 15, 2008, 21 pages.

Hunter, William E., Attorney, Response filed Dec. 22, 2010 in U.S. Appl. No. 12/014,702, filed Jan. 15, 2008, 17 pages.

Hunter, William E., Attorney, Pre-Appeal Brief filed Mar. 24, 2011 in U.S. Appl. No. 12/014,702, filed Jan. 15, 2008, 5 pages.

Zheng et al., "Chinese Remainder Theorem Based Group Key Management," Mar. 23-24, 2007, ACM, ACMSE 2007, 6 pages.

* cited by examiner

COMMUNICATING SUPPLEMENTAL INFORMATION OVER A BLOCK ERASURE CHANNEL

CROSS-REFERENCE TO RELATED APPLICATIONS

This application is related to U.S. patent application Ser. No. 12/014,702, entitled INFORMATION COMMUNICATION, to James A. Moorer, which was filed on Jan. 15, 2008. The disclosure of the above application is incorporated herein by reference in its entirety.

BACKGROUND

This specification relates to communicating information, for example, communicating information that supplements other information sent over a block erasure channel.

Various approaches have been used to address the unreliability of underlying network infrastructure when distributing information over a network. For example, when sending information through the Internet using a protocol that is not guaranteed to be always reliable, such as the User Datagram Protocol (UDP), Digital Fountain Codes have been used to break up a stream into a number of sub-streams such that the original stream can be reconstructed from a minimum number of sub-streams. Thus, when a sending device is using a communications channel that can sometimes drop entire blocks of data, the receiving device can still reconstruct the original information even when some of the sub-streams are unavailable at the receiving device.

In addition, various approaches have been used to address server load concerns for media distribution over a network, where the traditional approach is to provide a large central server farm that supplies a separate stream to each client computer. For example, BitTorrent, Inc. of San Francisco, Calif., provides software that breaks up files to be transferred and delivers the files piece by piece from one or many different sources in a peer-to-peer (P2P) network, where a file to be downloaded from a server to a client may actually come from another client (a "peer") that already downloaded that file. Other P2P software includes Kazaa Software, available from Sharman Networks Ltd. of Port Vila, Vanuatu, and Octoshape Software, available from Octoshape Apps of Copenhagen, Denmark.

Furthermore, in the context of digital media transmission, it can be desirable to send supplemental information along with the primary information being transmitted. For example, a media identification number can be transmitted along with video data, such as by using digital watermarking technology or other form of steganography, where the number (or a piece thereof) is embedded in each video frame. Moreover, some information can be transmitted over and over again by sending it out in parts, one part at a time, and then looping back to the first part from time to time. This type of transmission is sometimes called a digital carousel.

SUMMARY

This specification describes technologies relating to communicating information, for example, communicating information that supplements other information sent over a block erasure channel. In general, one or more aspects of the subject matter described in this specification can be embodied in one or more methods that include obtaining supplemental information to be sent along with primary information over a block erasure channel; calculating numerical residuals for the supplemental information using corresponding prime numbers; and outputting the numerical residuals to be sent along with the primary information over the block erasure channel for recovery of the supplemental information at a recipient device using a proper subset of the prime numbers. The one or more methods also include receiving a proper subset of numerical residuals that were calculated, using corresponding prime numbers, for supplemental information associated with primary information, the primary information and the numerical residuals having been sent over a block erasure channel; and recovering the supplemental information using the proper subset of numerical residuals.

These and other embodiments can optionally include one or more of the following features. A portion of the primary information can be received in sub-units, wherein each sub-unit includes a respective one of the proper subset of numerical residuals. The primary information can include audible or visual information, the sub-units can include update messages, and receiving the portion of the primary information can include receiving each of the proper subset of numerical residuals stegonagraphically contained within a respective update message. Furthermore, receiving the portion of the primary information can include receiving each numerical residual, and an indicator corresponding to the prime number for that numerical residual, as a digital watermark within each respective update message.

The receiving and the recovering can be performed by a first computer, and the method can include, at a second computer: obtaining the supplemental information to be sent along with the primary information over the block erasure channel; calculating the numerical residuals for the supplemental information using the corresponding prime numbers; and outputting the numerical residuals to be sent along with the primary information over the block erasure channel to the first computer. The method can also include, at the first computer, assessing the block erasure channel based on at least a portion of the information received through the block erasure channel, and providing feedback regarding the block erasure channel assessment to the second computer; and, at the second computer, modifying the number of the corresponding prime numbers used based on the feedback.

At a sender device, the method can include adding the numerical residuals as digital watermarks to respective sub-units of the primary information; and sending the sub-units over the block erasure channel to the recipient device. The adding can include adding the numerical residuals and indicators corresponding to the prime numbers for the numerical residuals as the digital watermarks. The can include dynamically modifying the number of the corresponding prime numbers used based on the block erasure channel, and dynamically modifying can include modifying the number of the corresponding prime numbers used based on feedback received from the recipient device for the block erasure channel. Moreover, at both the sender and recipient sides, the prime numbers can include integers.

The described methods can be implemented in a computer program product, encoded on a computer-readable medium, operable to cause data processing apparatus to perform the operations described. Such methods can also be implemented in a system, such as, a system including: a sender device to perform sender operations including: obtaining supplemental information to be sent along with primary information over a block erasure channel, calculating numerical residuals for the supplemental information using corresponding prime numbers, and outputting the numerical residuals to be sent along with the primary information over the block erasure channel; and a recipient device to perform recipient operations including: receiving a proper subset of the numerical residuals sent along with the primary information over the block erasure channel, and recovering the supplemental information using the proper subset of the numerical residuals.

Particular embodiments of the subject matter described in this specification can be implemented to realize one or more of the following advantages. Supplemental information can be sent along with primary information on a block erasure channel, and the supplemental information can be rapidly recovered despite the fact that a portion of the primary information and a portion of the supplemental information will be lost due to the nature of the channel. A digital carousel can be implemented in which carousel data can be rapidly and readily recovered. Moreover, the present systems and techniques can demonstrate increased advantage when implemented in the context of larger packets or low rates of packet recovery.

Furthermore, in some implementations of the present systems and techniques, the method can adapt to changes in the block loss rate. For example, if the receiving node reports losing more and more blocks, the sending node can generate some new prime numbers and send more (redundant) blocks. The node(s) can readily ramp up or ramp down the amount of redundancy. Either side of the communication can readily generate a few more (or less) remainders for transmitting, as needed, and communicate such changes on the fly to enable dynamic adjustment of the length (circumference) of a digital carousel. Thus, the amount of redundancy used need not be fixed in the design of the encoding algorithm.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
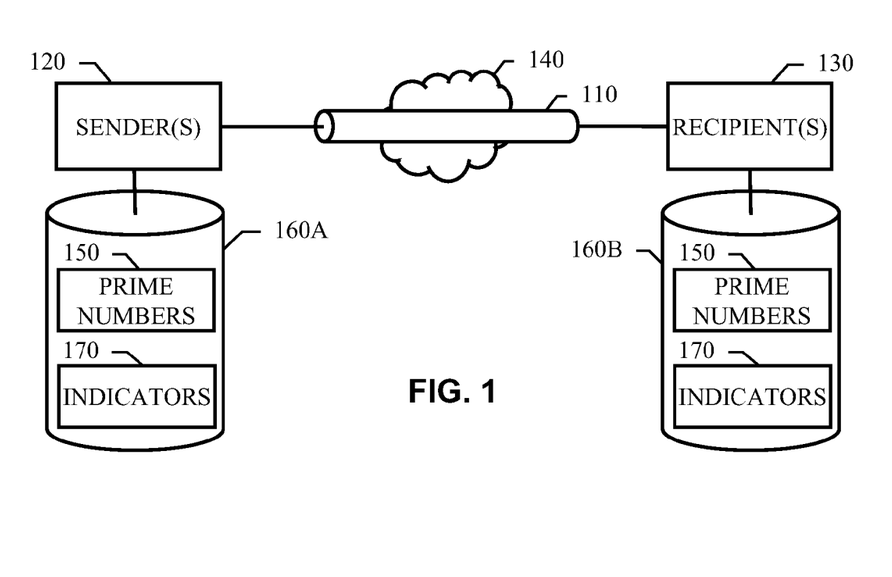
FIG. 1 shows an example system in which supplemental information is communicated over a block erasure channel.

FIG. 1 shows an example system in which supplemental information is communicated over a block erasure channel (110). The channel (110) provides a communication path for a sender device (120) to communicate with one or more recipient devices (130). This communication path is such that one or more portions of the information being sent, e.g., entire block(s) of data such as packet(s), can be lost entirely in transit. For example, the block erasure channel (110) can be a radio frequency (RF) channel over which a frequency modulation (FM) radio signal is sent. The block erasure channel (110) can be part of a computer network (140), such as the Internet or a virtual private network (VPN), over which User Datagram Protocol (UDP) packets are sent.

Other channels are also possible, including multi-faceted channels with multiple senders (120) and recipients (130). For example, the block erasure channel (110) can be part of a wireless communication network, such as a cell phone network. One can put together higher bandwidth by receiving from more than one transmitter (e.g., cell tower) at a time. In some implementations, cell phones can listen to several cell towers at once to get higher data rates. For radio or television signals delivered by satellite, one can use many satellites rather than just a few, so if one of the satellites fails or goes out of range, you can still put the signal together from the ones that are left. For Wi-Fi, each mobile device (e.g., a laptop computer) can connect to several wireless transmitters at a time, and pieces of the signal can be sent through each transmitter to be reassembled in the mobile device.

Each of the sender and recipient devices (120, 130) can have associated repositories (160A, 160B) in which prime numbers (150) and indicators (170) can be stored. When sending information to a recipient (130), multiple indicators (170) for the prime numbers (150) can be sent to the recipient (130) to identify the prime numbers (150) being used, as is described in further detail in connection with FIGS. 2 and 3. For example, the indicators (170) can be index values into a table of prime numbers, although in some implementations, no indicators (170) need be used. The prime numbers (150) that are to be used can be communicated to the recipient(s) (130) out of band from the primary information to be communicated. For example, the prime numbers (150) can be sent by a separate encrypted channel through the computer network (140) or outside of the computer network (140) entirely (e.g., by snail mail). Furthermore, the prime numbers (150) can be provided by other means, in an obfuscated fashion, or both.

Figure 2:
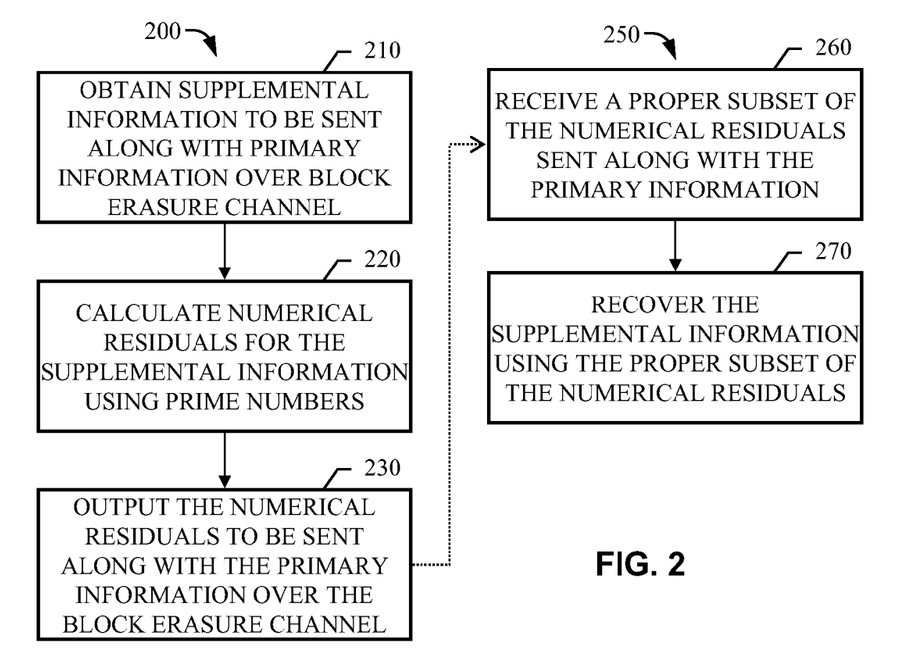
FIG. 2 shows an example method of communicating supplemental information over a block erasure channel.

FIG. 2 shows an example method of communicating supplemental information over a block erasure channel. A production process (200) includes obtaining (210) supplemental information to be sent along with primary information over a block erasure channel. This can include receiving the supplemental information or actively retrieving the supplemental information. In addition, the primary information can include audible or visual information, and the supplemental information can include licensing or enabling information that relates to the audible or visual information. For example, the secondary information can be metadata, such as a media identification (ID) number.

Numerical residuals are calculated (220) for the supplemental information using corresponding prime numbers For example, the supplemental information can be treated as an integer (or a series of integers) and be divided by different prime numbers that are also integers. The remainders from this division by the respective prime numbers can be used to communicate the supplemental information over the block erasure channel along with the primary information. With respect to generating the prime numbers, these can be generated using traditional techniques employed for public-private key encryption. The prime numbers can be generated before transmission of the primary information, which can involve using the same prime numbers for many different transmissions (e.g., the prime numbers can be stored in the sending and receiving hardware at time of manufacture, installation or configuration) or the prime numbers can be generated anew for each transmission. Moreover, one or more unique numbers associated with the generator device (e.g., the processor identifier for the computer that is to source the data) can be used in producing the prime numbers to be used. Widely available software can be used to produce very large prime numbers. For example, the Integrated Performance Primitives (IPP) subroutine package, available from Intel Corporation of Santa Clara, Calif., includes a routine to test large numbers for primes.

The numerical residuals to be sent along with the primary information over the block erasure channel are output (230). The outputting can include sending the numerical residuals to another process (e.g., a watermarking process) for inclusion in the primary information before transmission. For example, digital watermarking technology from Digimarc Corporation of Beaverton, Oreg., Thomson Societe Anonyme of Boulogne—Billancourt, France, Verance Corporation of San Diego, Calif., Royal Philips Electronics N.V.—Netherlands, or Verimatrix, Inc. of San Diego, Calif., can be used. The outputting can also include providing the numerical residuals to an input of a sending device or protocol, which can occur either before or after inclusion of the numerical residuals in the primary information.

The production process (200) can be performed by an originator of the information (e.g., a server computer providing a real-time media stream), and a consumption process (250) can be performed by one or more client devices. The consumption process (250) includes receiving (260) a proper subset of the numerical residuals sent along with the primary information over the block erasure channel. Note that a set $S_2$ is a proper subset of another set $S_1$ if, every element in $S_2$ is in $S_1$, and $S_1$ has at least one element that is not in $S_2$. Only a proper subset of the numerical residuals are received because some of the numerical residuals are likely lost during transmission on the block erasure channel, as is to be expected given the nature of the channel. Nonetheless, the supplemental information can recovered (270) using the proper subset of the numerical residuals and the corresponding prime numbers, after a sufficient number of the numerical residuals have been received.

A set of equations, as defined by the prime numbers (P) corresponding to the received proper subset of numerical residuals (R), can be solved. For example, the set of equations can be defined by $W=N_i \times P_i + R_i$, where each i is taken in turn from the received proper subset of all the prime number being used, and the number X of equations is equal to the length of this proper subset. To reconstruct the original word, W, the numbers $N_i$ can be found such that all X of the above equations hold true. Note that this is just a statement of what it means to be a remainder. This set of equations can be solved using the Chinese remainder theorem. The original word, W, can be computed by finding any one of the number $N_i$. The Chinese remainder theorem guarantees that there is a solution to these equations. Since the Chinese remainder theorem operates by construction, it shows exactly how to compute a solution as well.

The supplemental information can be reconstructed based on the solution these equations. The solution to the above equations is not unique, in that multiples of the product of the prime numbers can be added to the solution and it will still be a solution to the simultaneous equations. However, since the size of the original word, W, is known, the solution that can be represented within that size word is selected as the final solution. If the computed solution cannot fit into that size word, the value of the product of the prime numbers can be repeatedly subtracted from the obtained solution until it fits into the given word size.

The determination that a sufficient number of numerical residuals have been received can be an active check (e.g., whether the product of the corresponding prime numbers is larger than can be represented in the target data word size being used to recover the information), or the determination can be implicit in that once a certain amount of the primary information has been received, it can be expected that a sufficient number of numerical residuals have been received also. For example, the supplemental information can be a piece of data encoded as a large word and communicated using its numerical residuals (e.g., 25-bit integer remainders after dividing by 25-bit prime numbers) one after the other (looping back to the first numerical residual on occasion) as watermarks in video data. Not all of these numerical residuals will actually be recovered, but only a proper subset are needed to recover the original supplemental information.

For example, if the number is a 256-bit number, and the video data allows 30 to 40 bits to be embedded into each frame as a watermark, without this embedded data being visible, the present techniques can be used to reduce the number of frames that need to be transmitted before the full 256-bit number can be recovered. For example, 128 prime numbers of length 25 bits can be selected and built into the encoder and the decoder for the video data. To transmit data, each prime number can be used in turn to produce 128 25-bit remainders. Each 25-bit remainder can be transmitted, along with a 7-bit index value that identifies the prime number used, in a respective video frame. Alternatively, both the sender and the receiver can know which prime number is being used in each frame based on other information about the frame or the communication context, in which case, an index value (or other prime number indictor) need not be used directly with the remainders (or other numerical residuals).

At the decoding end, once 11 remainders (corresponding to different prime numbers) are received, the original 256-bit number can be recovered. Even if a substantial portion (e.g., 40%) of the watermark numbers cannot be recovered at the decoder, the original 256-bit number can still be recovered within a reasonable amount of time (e.g., about 36 video frames to have a 95% chance of getting 11 distinct numbers). Various other implementations are also possible.

For example, the sender can modify the number of prime numbers used based on the observed block loss rate. If the condition of the channel degrades, resulting in more lost blocks, the sending node can use additional prime numbers (either held in reserve or generated on the fly) and add additional redundancy to the communications by increasing the (circumference) of a digital carousel. If the channel later improves, the number of prime numbers used can be decreased. Thus, the number of prime numbers used can be modified dynamically based on the block erasure channel.

Figure 4:
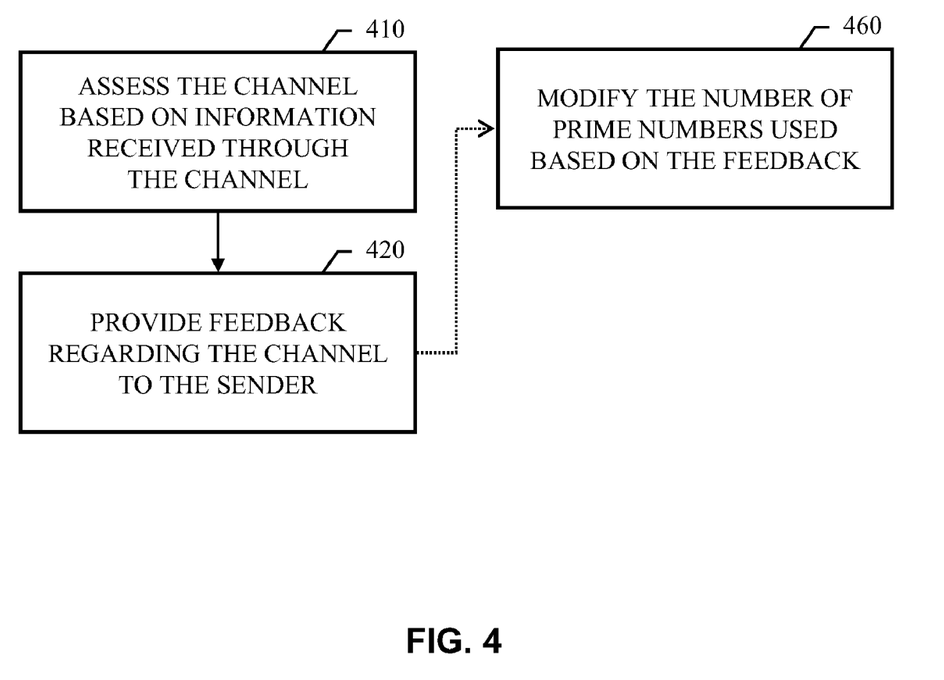
FIG. 4 shows an example method of dynamically modifying the number of the prime numbers used for communicating the supplemental information based on the block erasure channel.

The observation of the block loss rate can be performed with or without the assistance of the recipient(s). Such information can be obtained from other sources, or the system can specify a mechanism by which the recipient(s) can communicate such information back to the sender, either on the same channel or on a different channel. FIG. 4 shows an example method of dynamically modifying the number of the prime numbers used for communicating the supplemental information based on the block erasure channel. The recipient can assess (410) the block erasure channel based on the information received through the block erasure channel, and provide (420) feedback regarding the block erasure channel assessment to the sender. The sender can in turn modify (460) the number of prime numbers used based on this feedback.

Figure 3:
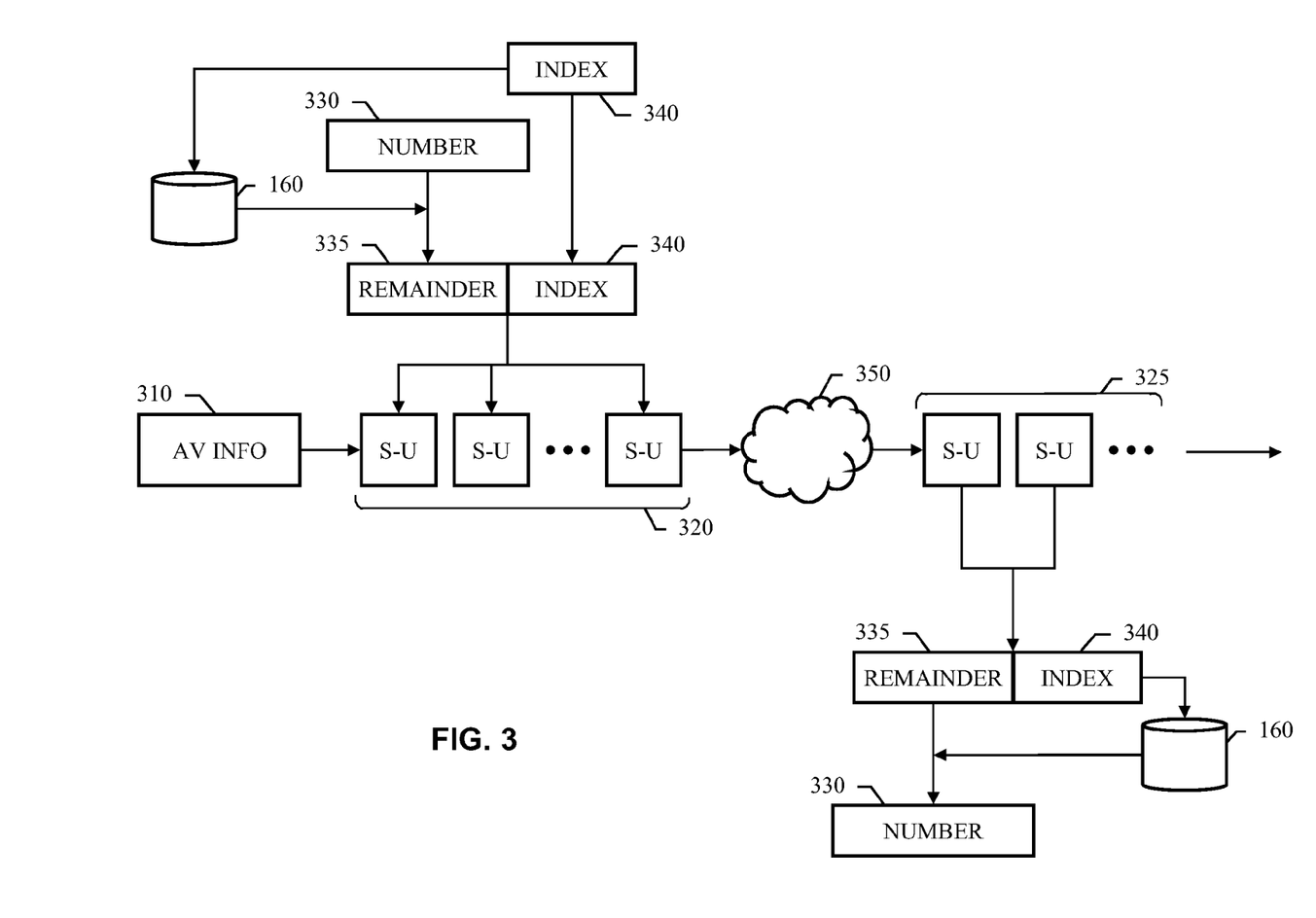
FIG. 3 shows another example system in which supplemental information is communicated along with audible or visual information over a block erasure channel.

FIG. 3 shows another example system in which supplemental information is communicated along with audible or visual information over a block erasure channel. The primary information to sent can be audible or visual (AV) information (310), which can include both audible and visual information, such as in video data. This AV information (310) can be broken up in the sub-units (320) for transmission. For example, the sub-units (320) can include update messages, such as updates to character positions in a multiplayer online game or updates to video data in an online multimedia stream.

The supplemental information can be a number (330), such as a media ID number, that is to be sent along with the AV information (310). For example, the number (330) can be a 256-bit number as described above. In addition, an error correction code (ECC) (e.g., a 32-bit error check word) can be added to the number (330) to make sure that the final recovered number (330) is correct and has not changed mid-stream.

The number (330) (plus any error check extension) can be divided by a prime number (e.g., a 25-bit prime number), and the remainder (335) of this division can be combined with an index value (340) (e.g., a 7-bit index number) corresponding to the prime number. Note that although the combined number (335, 340) (e.g., a 32-bit combined number) is shown as a concatenation, other combinations are also possible. For example, given a remainder, R, an index, I, and a maximal prime number known to be greater than any other prime number being used to form the remainders (335), the maximal prime number, MP, can be used to mix R and I using the arithmetic combination MP*I+R. To get back I and R at the receiving end, simply divide by MP: the quotient will be I and the remainder R.

The combined number (335, 340) can be added to a sub-unit (320) in the transmission, and for each new sub-unit (320) a new combined number (335, 340) can be added until all the available prime numbers have been used (at which point, the process can loop back to the first prime number). Each new combined number (335, 340) can be generated using the next prime number in the set (e.g., 128 25-bit prime numbers), and the index value (340) can be incremented for each new sub-unit (320) with a wrap around once all the available prime numbers have been gone through (e.g., wrapping from index 127 around to zero). Adding the combined number (335, 340) can include using stegonographic techniques, such as digital watermarking, to add each respective combined number (335, 340) to each respective sub-unit (320).

In addition, various cryptographic techniques can be used to further conceal and secure the combined number (335, 340) in the transmission, and error correction techniques can be employed as well. For example, error correction can be done with know techniques, such as Hamming codes. For encryption, one can use various known encryption technologies, such as public-key codes from RSA Security Inc. of Bedford, Mass., the open-source PGP ("Pretty Good Privacy"), or standards-based codes, such as AES128-CBC ("Advanced Encryption Standard").

The sub-units (320) can be transmitted through a network (350) to one or more receiving devices. The received sub-units (325) may not include all of the transmitted sub-units (320) since one or more of the sub-units (320) may be lost in the network (350). Nonetheless, a proper subset of the combined numbers (335, 340) can be retrieved from the received sub-units (325) using the corresponding inverse operation for the stegonographic and any cryptographic techniques employed. Once a sufficient number of the sub-units (325) have been received, the number (330) can be recovered. For example, in the 256-bit number plus 32-bit ECC example, once twelve good payloads, having different prime index numbers, are collected, the 256-bit number can be reconstructed.

Each index value (340) can be used to identify the corresponding prime number, which in turn can be used to reconstruct the supplemental information number (330) once a sufficient number of the sub-units (325) have been received. In the 256-bit number plus 32-bit error check word example, the Chinese remainder theorem can be used to recover the extended number, which amounts to finding e1r1+e2r2+ . . . e12r12, where e1 through e12 are coefficients that are calculated from the 12 prime numbers and r1 through r12 are the residuals. Note that this can involve the use of multiple-precision arithmetic. The 32-bit ECC can be computed and compared to the received ECC. If they match, then the number (330) has been recovered. If they don't match, the number (330) was changed mid-stream. If this change is a result of data corruption during transmission, each newly received, combined number (335, 340) can be compared against a previously found one until the source of the error is identified, at which point, reconstruction of the number (330) can be attempted again. In general, using this method in the 256-bit number plus 32-bit ECC example, there should be a 95% chance of recovering the number (330) after about 43 frames.

In addition, it should be noted that the change to the number (330) may be caused by a change in the number (330) at the sending end (e.g., when the media ID changes in the course of transmission) rather than corruption during transmission. In this case, the oldest payload can be thrown out, a new good payload can be found, and reconstruction of the number (330) can be attempted again. Note that in this changing-at-the-source example, some of the 12 payloads came from one media ID and the rest came from a different media ID. Thus, dropping of the oldest payload can be repeated until the number (330) is recovered.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a cross-platform runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Thus, particular embodiments of the invention have been described. Other embodiments are within the scope of the following claims.

Moreover, the description above is provided within the context of standard integers, but the systems and techniques described can be implemented using other number systems since the Chinese remainder theorem can be implemented in other number systems as well. For example, the method can be implemented using any ring, R, that has (two-sided) ideals, Ij, that are coprime. "Ring", "ideal" and "coprime" are terms in mathematics with standard definitions. Integers are an example of a ring. A ring can also be made out of polynomials, out of 32-bit words, and other things, and the present systems and techniques can be applied using other rings. For example, a ring of polynomials over $GF(2)^n$ can be used for coding. These can be used to represent n-bit binary numbers. Thus, as used herein, the term "prime number" is not limited to integers, but rather encompasses any prime element within a suitable number system.

What is claimed is:

1. A computer-implemented method comprising:
receiving a proper subset of numerical residuals that were calculated, using corresponding prime numbers, for supplemental information associated with primary information, the primary information and the numerical residuals having been sent over a block erasure channel;
recovering the supplemental information using the proper subset of numerical residuals;
wherein the receiving and the recovering are performed by a first computer, and the method comprises, at a second computer:
obtaining the supplemental information to be sent along with the primary information over the block erasure channel;
calculating the numerical residuals for the supplemental information using the corresponding prime numbers; and outputting the numerical residuals to be sent along with the primary information over the block erasure channel to the first computer.

2. The method of claim 1, comprising receiving a portion of the primary information in sub-units, wherein each sub-unit includes a respective one of the proper subset of numerical residuals.

3. The method of claim 2, wherein the primary information comprises audible or visual information, the sub-units comprise update messages, and receiving the portion of the primary information comprises receiving each of the proper subset of numerical residuals stegonagraphically contained within a respective update message.

4. The method of claim 3, wherein receiving the portion of the primary information comprises receiving each numerical residual, and an indicator corresponding to the prime number for that numerical residual, as a digital watermark within each respective update message.

5. The method of claim 1, comprising:
at the first computer, assessing the block erasure channel based on at least a portion of the information received through the block erasure channel, and providing feedback regarding the block erasure channel assessment to the second computer; and
at the second computer, modifying the number of the corresponding prime numbers used based on the feedback.

6. The method of claim 1, wherein the prime numbers comprise integers.

7. A computer program product, encoded on a non-transitory computer-readable medium, operable to cause data processing apparatus to perform operations comprising:
receiving a proper subset of numerical residuals that were calculated, using corresponding prime numbers, for supplemental information associated with primary information, the primary information and the numerical residuals having been sent over a block erasure channel;
recovering the supplemental information using the proper subset of numerical residuals;
wherein the receiving and the recovering are performed by a first computer, and the operations comprise, at a second computer:
obtaining the supplemental information to be sent along with the primary information over the block erasure channel;
calculating the numerical residuals for the supplemental information using the corresponding prime numbers; and
outputting the numerical residuals to be sent along with the primary information over the block erasure channel to the first computer.

8. The computer program product of claim 7, the operations comprising receiving a portion of the primary information in sub-units, wherein each sub-unit includes a respective one of the proper subset of numerical residuals.

9. The computer program product of claim 8, wherein the primary information comprises audible or visual information, the sub-units comprise update messages, and receiving the portion of the primary information comprises receiving each of the proper subset of numerical residuals stegonagraphically contained within a respective update message.

10. The computer program product of claim 9, wherein receiving the portion of the primary information comprises receiving each numerical residual, and an indicator corresponding to the prime number for that numerical residual, as a digital watermark within each respective update message.

11. The computer program product of claim 7, wherein the operations comprise:

at the first computer, assessing the block erasure channel based on at least a portion of the information received through the block erasure channel, and providing feedback regarding the block erasure channel assessment to the second computer; and
at the second computer, modifying the number of the corresponding prime numbers used based on the feedback.

12. The computer program product of claim 7, wherein the prime numbers comprise integers.

13. A system comprising:
a sender device to perform sender operations comprising:
obtaining supplemental information to be sent along with primary information over a block erasure channel,
calculating numerical residuals for the supplemental information using corresponding prime numbers, and
outputting the numerical residuals to be sent along with the primary information over the block erasure channel; and
a recipient device to perform recipient operations comprising:
receiving a proper subset of the numerical residuals sent along with the primary information over the block erasure channel, and
recovering the supplemental information using the proper subset of the numerical residuals.

14. The system of claim 13, wherein the sender operations comprise:
adding the numerical residuals as digital watermarks to respective sub-units of the primary information; and
sending the sub-units over the block erasure channel to the recipient device.

15. The system of claim 14, wherein the adding comprises adding the numerical residuals and indicators corresponding to the prime numbers for the numerical residuals as the digital watermarks.

16. The system of claim 13, wherein the primary information comprises audible or visual information, the primary information is sent over the block erasure channel as update messages, and the recipient operations comprise receiving each of the proper subset of numerical residuals stegonagraphically contained within a respective one of the update messages.

17. The system of claim 16, wherein receiving each of the proper subset of numerical residuals comprises receiving each numerical residual, and an indicator corresponding to the prime number for that numerical residual, as a digital watermark within each respective update message.

18. The system of claim 13, wherein the sender operations comprise dynamically modifying the number of the corresponding prime numbers used based on the block erasure channel.

19. The system of claim 18, wherein the dynamically modifying comprises modifying the number of the corresponding prime numbers used based on feedback received from the recipient device for the block erasure channel.

20. The system of claim 19, wherein the recipient operations comprise:
assessing the block erasure channel based on at least a portion of the information received through the block erasure channel; and
providing the feedback regarding the block erasure channel assessment to the sender device.

21. A computer-implemented method comprising:
obtaining supplemental information to be sent along with primary information over a block erasure channel;

calculating numerical residuals for the supplemental information using corresponding prime numbers; and outputting the numerical residuals to be sent along with the primary information over the block erasure channel for recovery of the supplemental information at a recipient device using a proper subset of the prime numbers.

22. The method of claim 21, wherein the primary information comprises audible or visual information, the method comprising:

adding the numerical residuals as digital watermarks to respective sub-units of the primary information; and sending the sub-units over the block erasure channel to the recipient device.

23. The method of claim 22, wherein the adding comprises adding the numerical residuals and indicators corresponding to the prime numbers for the numerical residuals as the digital watermarks.

24. The method of claim 21, comprising dynamically modifying the number of the corresponding prime numbers used based on the block erasure channel.

25. The method of claim 24, wherein the dynamically modifying comprises modifying the number of the corresponding prime numbers used based on feedback received from the recipient device for the block erasure channel.

26. A computer program product, encoded on a non-transitory computer-readable medium, operable to cause data processing apparatus to perform operations comprising:

obtaining supplemental information to be sent along with primary information over a block erasure channel;

calculating numerical residuals for the supplemental information using corresponding prime numbers; and outputting the numerical residuals to be sent along with the primary information over the block erasure channel for recovery of the supplemental information at a recipient device using a proper subset of the prime numbers.

27. The computer program product of claim 26, wherein the primary information comprises audible or visual information, the operations comprising:

adding the numerical residuals as digital watermarks to respective sub-units of the primary information; and sending the sub-units over the block erasure channel to the recipient device.

28. The computer program product of claim 27, wherein the adding comprises adding the numerical residuals and indicators corresponding to the prime numbers for the numerical residuals as the digital watermarks.

29. The computer program product of claim 26, the operations comprising dynamically modifying the number of the corresponding prime numbers used based on the block erasure channel.

30. The computer program product of claim 29, wherein the dynamically modifying comprises modifying the number of the corresponding prime numbers used based on feedback received from the recipient device for the block erasure channel.

* * * * *

UNITED STATES PATENT AND TRADEMARK OFFICE
CERTIFICATE OF CORRECTION

| | | |
|---|---|---|
| PATENT NO. | : 8,082,320 B1 | Page 1 of 1 |
| APPLICATION NO. | : 12/100348 | |
| DATED | : December 20, 2011 | |
| INVENTOR(S) | : James A. Moorer | |

It is certified that error appears in the above-identified patent and that said Letters Patent is hereby corrected as shown below:

Column 11, line 12 (line 5 of claim 3) of the printed patent, delete "stegonagraphically" and insert -- steganographically --.

Column 11, lines 59-60 (lines 5-6 of claim 9) of the printed patent, delete "stegonagraphically" and insert -- steganographically --.

Column 11, lines 42-43 (lines 5-6 of claim 16) of the printed patent, delete "stegonagraphically" and insert -- steganographically --.

Signed and Sealed this
Sixth Day of March, 2012

David J. Kappos
*Director of the United States Patent and Trademark Office*